United States Patent [19]
Alidina et al.

[11] Patent Number: 5,889,689
[45] Date of Patent: Mar. 30, 1999

[54] HIERARCHICAL CARRY-SELECT, THREE-INPUT SATURATION

[75] Inventors: Mazhar M. Alidina, Allentown, Pa.; Larry R. Tate, South Barrington, Ill.

[73] Assignee: Lucent Technologies Inc., Murray Hill, N.J.

[21] Appl. No.: 927,558

[22] Filed: Sep. 8, 1997

[51] Int. Cl.[6] ............................. G06F 7/38; G06F 11/00
[52] U.S. Cl. .................................. 364/745.03; 364/737
[58] Field of Search ..................... 364/745.03, 748.04, 364/786.01, 787.01, 788, 737

[56] References Cited

U.S. PATENT DOCUMENTS

| | | | |
|---|---|---|---|
| 3,789,206 | 1/1974 | Heightley | 364/745.03 |
| 4,819,198 | 4/1989 | Noll et al. | 364/787.01 |
| 5,189,636 | 2/1993 | Patti et al. | 364/786.01 |
| 5,745,397 | 4/1998 | Nadehara | 364/745.03 |

*Primary Examiner*—Tan V. Mai
*Attorney, Agent, or Firm*—David L. Smith

[57] ABSTRACT

There is disclosed a first adder subtractor combines the largest positive number or largest negative number capable of being represented by the number of bits in the datapath, as determined by the sign of an input to a second adder with a first input to generate a first potential sum. A second adder operating in parallel with the first adder combines first, second and third inputs to generate a second potential sum. An overflow detector combines the first and second inputs of the second adder to determine if there is an overflow. If an overflow is not present, a multiplexer selects the output of the second adder as the output to be saturated. If an overflow is present, the multiplexer selects the output from the first adder as the output to be saturated.

17 Claims, 1 Drawing Sheet

HIERARCHICAL CARRY-SELECT, THREE-INPUT SATURATION

FIELD OF THE INVENTION

This application relates to saturation and particularly to three-input saturation.

BACKGROUND OF THE INVENTION

Addition operations in a processor either add or subtract representations of numbers. Subsequent to the addition operation, the result of the addition operation, here referred to as a sum, is evaluated to determine whether an overflow has occurred. If an overflow has occurred, the sum is saturated. Saturating means setting to the largest quantity, positive or negative, capable of being represented by the number of bits in the sum. If an overflow occurs in a negative sense, the sum is set to the largest negative number. If an overflow occurs in a positive sense, the sum is set to the largest positive number.

Bit exact standards have been written with single-multiply-accumulate (MAC) processor architectures in mind. Single MAC processors, which typically have one, two-input adder, saturate a sum following each addition operation. For processors requiring the sum of three inputs, a three-input saturation must be performed to be compliant with the bit-exact standards developed for single MAC processors having one two-input adder. To combine three inputs to produce a result, in some combination of addition and subtraction, such as two sequential two-input additions or one three input addition, followed by saturating the result does not assure compliance with bit exact standards developed for single MAC processors having a two-input adder.

One technique to achieve compliance with bit-exact standards in a three-input saturation is to add two of the three inputs, to produce a first sum, saturate the first sum then add the saturated sum to the third input to generate a second sum. Subsequently, the second sum is saturated. This technique has the shortcoming of requiring two sequential addition operations in the critical path of generating the three-input saturated result. What is needed is a technique to generate a three-input saturated result in less time, that is in fewer processor clock cycles, than is required by the two sequential addition operations.

SUMMARY OF THE INVENTION

In accordance with the present invention, a first adder-subtractor combines the largest positive number or largest negative number capable of being represented by the number of bits in the datapath, as determined by the sign of an input to a second adder, with a first input to generate a first potential sum. A second adder operating in parallel with the first adder combines first, second and third inputs to generate a second potential sum. An overflow detector combines the first and second inputs of the second adder to determine if there is an overflow. If an overflow is not detected, a multiplexer selects the output of the second adder as the output. If an overflow is detected, the multiplexer selects the output from the first adder as the output. The multiplexer output is saturated.

DETAILED DESCRIPTION

Figure 1:
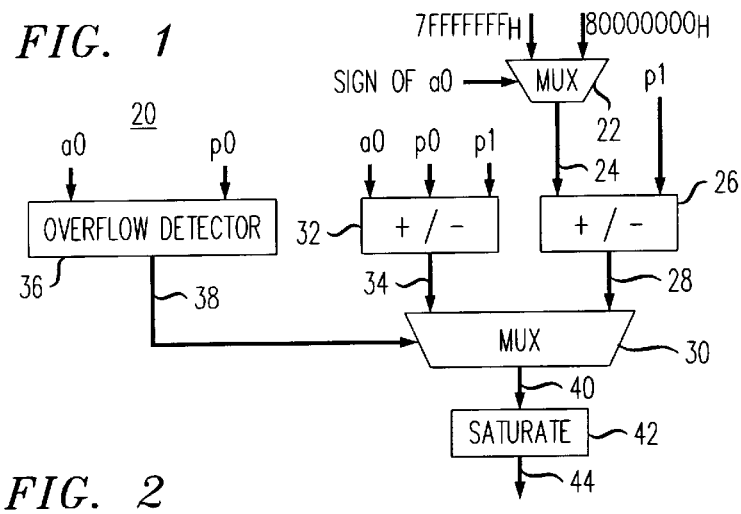
FIG. 1 is a schematic diagram of a hierarchical carry-select three-input saturation circuit in accordance with the present invention.

A hierarchical carry-select saturation circuit 20 to provide a hierarchical carry-select three-input saturation in accordance with the present invention is shown in FIG. 1. Circuit 20, which may be part of an integrated circuit, calculates a three-input saturation in accordance with equation (1):

$$\text{OUTPUT} = \text{SAT}\ (\text{SAT}\ (a0+p0)+p1) \tag{1}$$

The addition operations indicated in equation (1) could, in any combination, also be subtraction operations. The variables being added: a0, p0 and p1, are used interchangeably to represent a register and its numerical contents. Whether the register or the numerical contents is intended should be evident from the context.

Multiplexer 22 selects one of its inputs as an output 24 based on the sign bit of an input to adder-subtractor 32. The inputs to multiplexer 22 represent the largest negative value that can be represented in the number of bits in the datapath and the largest positive value that can be represented in the number of bits in the datapath. A 32-bit datapath is illustrated. The largest negative number, represented in hexadecimal, is $80000000_H$; the largest positive number, represented in hexadecimal, is $7FFFFFFF_H$. Adder-subtractor 26 receives as inputs the contents of register p1 and the output 24 from multiplexer 22. Adder-subtractor 26 is a two-input adder that adds, or subtracts, the inputs to produce an output that is a first potential sum 28. First potential sum 28 is provided as a first input to multiplexer 30.

Simultaneously with adder-subtractor 26 combining output 24 and p1 to produce the first potential sum 28, three-input adder-subtractor 32 receives as inputs the numerical contents of registers p1, p0 and a0 and adds, or subtracts, the inputs to produce an output that is a second potential sum 34. Second potential sum 34 is provided as a second input to multiplexer 30.

Simultaneously with adder-subtractor 26 operating to produce first potential sum 28 and adder-subtractor 32 operating to produce second potential sum 34, overflow detector 36 evaluates a0 and p0 to detect whether an overflow condition will occur in the sum of a0 and p0. Overflow detector 36, which may be a carry generator for generating a carry overflow as is known in the art, provides a single bit output 38. Output 38 takes on a first state, such as a logic 0, when no overflow occurs, and takes on a second state, such as a logic 1, when an overflow condition occurs.

Output 38 provides the select input to multiplexer 30. When output 38 takes on a first state, such as a logic 0 indicating no overflow occurs in the sum of a0 and p0, the second potential sum 34 output from adder-subtractor 32 is selected as output 40 of multiplexer 30. When output 38 takes on a second state, such as a logic 1 indicating an overflow has occurred in the sum of a0 and p0, the first potential sum 28 output from adder-subtractor 26 is selected as output 40 of multiplexer 30.

Output 40 is the input to saturate circuit 42. Saturate circuit 42 saturates output 40 if an overflow has occurred in generating output 40. The output from saturate circuit 42 is output 44, which is also OUTPUT in equation (1).

Circuit 20 provides the advantage of simultaneously calculating two potential sums from which to select, and simultaneous with calculating the two potential sums also calculating whether an overflow will occur in the output of the three-input adder. The condition of presence or absence of an overflow is used as a control to select the correct one of the two sums as an output. In this manner, adder-subtractors 32 and 26 operate in parallel rather than in series thereby reducing the duration of the critical path when generating a three-input saturation.

Figure 2:
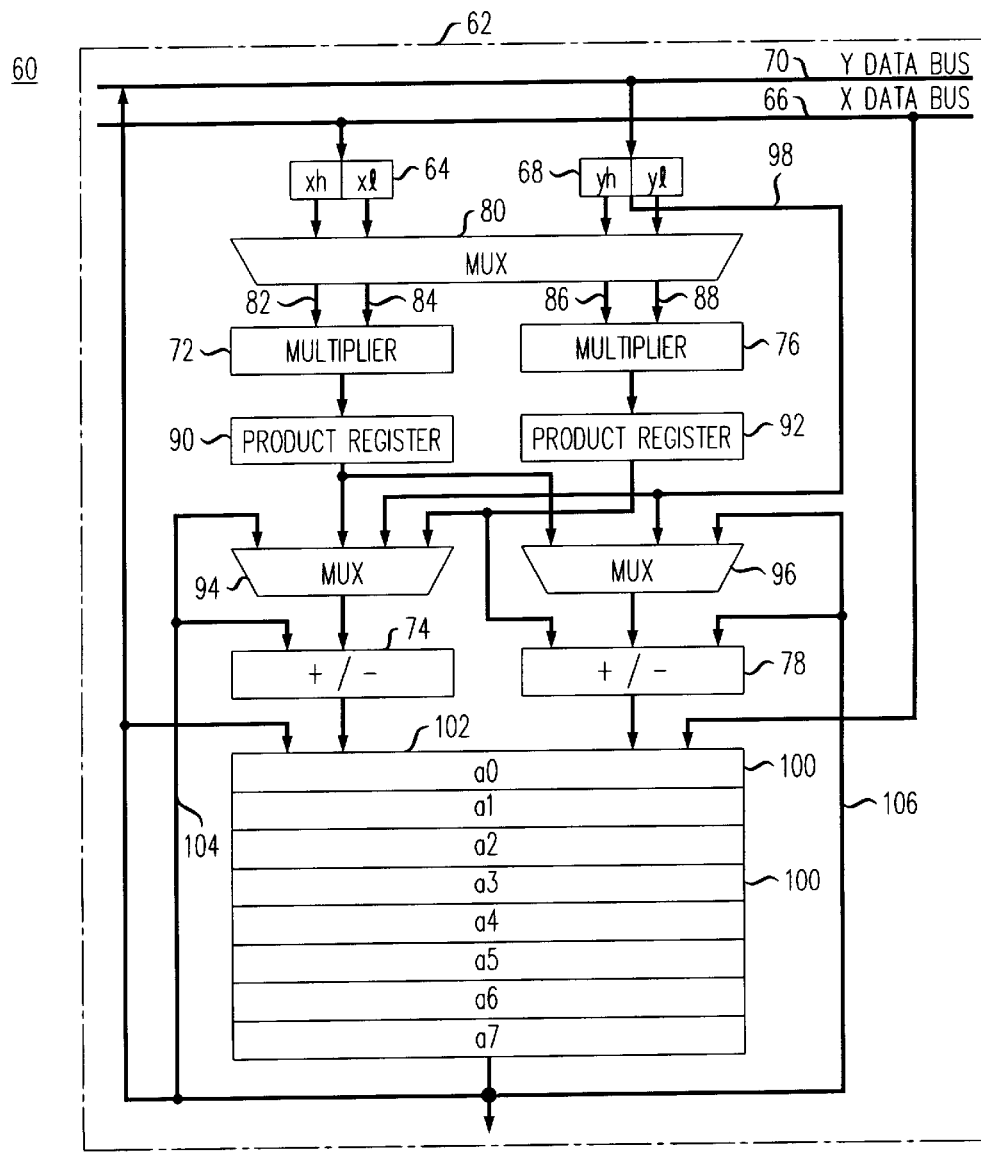
FIG. 2 is a schematic diagram of a portion of a data arithmetic unit incorporating the hierarchical carry-select three-input saturation of the present invention.

An application for a hierarchical carry-select three-input saturation circuit occurs in a dual MAC processor where one of the adders is a three-input adder, as shown in FIG. 2. Data arithmetic unit (DAU) 60 is a portion of a processor 62 such as microprocessor, microcontroller, or digital signal processor. Processor 62, which is typically fabricated as in integrated circuit, may be used in many applications such as personal computers or transceivers in communication systems. DAU 60 includes a first register 64, also designated the X register, which may be segmented into high and low portions. An n-bit word can be latched in each of the high portion, designated xh, and the low portion designated xl. The first input register 64 is coupled to receive data such as from X databus 66.

Second input register 68, also designated the Y register, may be segmented into high and low portions. An n-bit word can be latched in each of the high portion, designated yh, and the low portion, designated yl. The second input register is coupled to receive data such as from Y databus 70. DAU 60 includes two multiply-accumulate paths, although the invention is not limited thereto. Multiplier 72 and adder-subtractor 74 provide a first multiply-accumulate path; multiplier 76 and adder-subtractor 78 provide a second multiply-accumulate path.

The xh and xl bits from first input register 64 as well as the yh and yl bits from second input register 68 are independently available to each multiplier 72 and 76 by way of crossover multiplexor 80. Crossover multiplexer 80 provides two inputs to each multiplier 72 and 76. Inputs 82 and 84 are provided to multiplier 72; inputs 86 and 88 are provided to multiplier 76. The output from either the high portion or low portion of either first input register 64 or second input register 68 can provide any of the inputs 82, 84, 86 or 88, to multipliers 72 and 76 through crossover multiplexer 80.

The product output from multiplier 72 is stored in a first product register 90, also designated p0; the product output from multiplier 76 is stored in a second product register 92, also designated p1. The product output from multipliers 72 and 76 may be provided to either or both adder-subtractors 74 and 78 by way of multiplexers 94 and 96, or directly thereto.

Multiplexers 94 and 96 may have other inputs, such as the inputs to the second input register 68 over line 98. The outputs from adder-subtractors 74 and 78 are provided to registers 100 of a register file 102. The contents of registers 100 are available as inputs to multiplexer 94 and adder-subtractor 74 over line 104 and to multiplexer 96 and adder-subtractor 78 over line 106.

Recognizing adder-subtractors 74 and 78 of FIG. 3 as adder-subtractors 26 and 32 respectively in FIGS. 1 and 2, and recognizing one skilled in the art could provide the additional circuitry of either FIGS. 1 or 2 in the environment of a dual MAC processor shown in FIG. 3, the application of a hierarchical carry-select three-input saturation circuit in a dual MAC processor is readily evident. In many applications, computing the sum of three-inputs using adder-subtractor 74 would leave adder-subtractor 78 idle as illustrated by equation (2):

$$a0 = a1 + p0 + p1 \qquad (2)$$

Equation (2) indicates that the product stored in each of product registers p0 and p1 (90 and 92) are added in adder 78 to the contents of register a1 and the result is stored in register a0. The contents of product register 92 are provided as an input directly to adder 78. The contents of product register 90 are provided as an input to adder 78 by way of multiplexer 96. The contents of register a1 are provided as an input to adder 78 over line 106. When a three-input add operation is carried out using adder 78 and not requiring a three-input bit exact saturation, adder 74 may be idle. However, when a three-input add operation in adder 78 requires a bit exact saturation, adder 74 may be employed in the circuit shown in FIG. 1 to provide the bit exact saturation in accordance with the present invention. In this manner, a dual MAC processor with a three-input adder, and a second adder available for calculation of an alternate potential sum, requires little additional hardware to complete implementation of the hierarchical carry-select saturation circuit of FIG. 1.

The three input saturation technique of the present invention is approximately twice as fast as the two sequential addition technique described above in the prior art. The speed advantage is gained by having additional hardware and operating two adders in parallel and selecting the appropriate output based on an overflow condition as determined by an overflow detector. One skilled in the art could extend the inventive technique to multiple MAC datapaths. The inventive technique is particularly useful in integrated circuits used in communications systems.

While the illustrative embodiment has not been described as incorporating pipelining, one skilled in the art would recognize the enhanced computational efficiency available by utilizing pipelining in the design. Pipelining is achieved by initiating computation with a new data set before completing computations with a previous data set. The more latches used in pipelining, the greater the depth of pipelining. Pipelining causes an initial latency in computation time required to fill the pipeline, but maximizes usage of resources such as adders. Furthermore, when a priori knowledge of the input data is known such as an overflow will not occur in adder-subtractor 32, adder-subtractor 26 may be powered down to save power.

The invention claimed is:

1. A method of generating a three-input saturation, comprising the steps of:

generating a first potential sum that is a combination of one of the quantities to be added and a representation of the largest quantity capable of being represented for a given number of bits;

simultaneous with generating the first potential sum, generating a second potential sum that is a combination of three quantities;

also simultaneously with generating the first potential sum, detecting the presence or absence of an overflow in the sum of two of the three quantities combined to generate the second potential sum; and selecting one of the first potential sum and the second potential sum as a selected sum based on the presence or absence of an overflow.

2. The method of generating a three-input saturation, as recited in claim 1, wherein the selecting step comprises:

selecting the first potential sum when an overflow is present.

3. The method of generating a three-input saturation, as recited in claim 1, wherein the selecting step comprises:

selecting the second potential sum in the absence of an overflow.

4. The method of generating a three-input saturation, as recited in claim 1, further comprising the step of:

saturating the selected sum.

5. The method of generating a three-input saturation, as recited in claim 1, further comprising the step of:

selecting between a representation of the largest negative number and a representation of the largest positive number as the representation of the largest quantity capable of being represented for a given number of bits.

6. A method of generating a three-input saturation, comprising the steps of:

selecting between a representation of the largest negative number and a representation of the largest positive number capable of being represented for a given number of bits as a selected representation;

generating a first potential sum that is a combination of the selected representation and a first quantity;

simultaneously with generating the first potential sum, generating a second potential sum that is a combination of the first quantity, a second quantity and a third quantity;

also simultaneously with generating the first potential sum, detecting the presence or absence of an overflow in the sum of the second and third quantities; and selecting one of the first potential sum and the second potential sum as a selected sum based on the presence or absence of an overflow.

7. The method of generating a three-input saturation, as recited in claim 6, wherein selecting one of the first potential sum and second potential sum comprises the step of:

selecting the first potential sum when an overflow is present.

8. The method of generating a three-input saturation, as recited in claim 6, wherein selecting one of the first potential sum and second potential sum comprises the step of:

selecting between negative and positive representations based on a sign of the third quantity.

9. The method of generating a three-input saturation as recited in claim 6, further comprising the step of:

saturating the selected sum.

10. A circuit for providing a three-input saturation, comprising:

a first adder adapted to add a first quantity to a representation of the largest number capable of being represented in a given number of bits to generate a first potential sum;

a second adder adapted to add in parallel with the first adder the first quantity to second and third quantities to generate a second potential sum;

an overflow detector adapted to receive the second and third quantities, the overflow detector adapted to detect an overflow in a sum of the second and third quantities and provide an output indicative of the presence or absence of an overflow; and a multiplexer adapted to receive as a first input the first potential sum, as a second input the second potential sum and as a third input the overflow detector output, the multiplexer adapted to select one of the first and second potential sums as an output based on a state of the third input.

11. A circuit as recited in claim 10, further comprising a saturation circuit adapted to receive and saturate the multiplexer output.

12. A circuit as recited in claim 10, further comprising a second multiplexer, the second multiplexer adapted to select between first and second representations of the largest number capable of being represented in a given number of bits.

13. A circuit as recited in claim 10, further comprising logic circuitry adapted to power down the first adder when an overflow condition is not expected, the multiplexer selecting the second potential sum as an output when the first adder is powered down.

14. A circuit as recited in claim 10, wherein the circuit is an integrated circuit.

15. A circuit as recited in claim 10, further comprising first and second multipliers, the first and second multipliers adapted to generate two of the quantities added in the second adder.

16. A circuit as recited in claim 15, wherein the circuit is an integrated circuit.

17. A circuit as recited in claim 16, wherein the circuit is a digital signal processor.

* * * * *